US011681630B2

(12) United States Patent
Tomlin et al.

(10) Patent No.: US 11,681,630 B2
(45) Date of Patent: Jun. 20, 2023

(54) SYSTEM AND METHOD FOR SCALING COMMAND ORCHESTRATION THROUGH ADDRESS MAPPING

(71) Applicant: Kioxia Corporation, Tokyo (JP)

(72) Inventors: Andrew John Tomlin, San Jose, CA (US); Michael Anthony Moser, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/025,911

(22) Filed: Sep. 18, 2020

(65) Prior Publication Data

US 2022/0091988 A1  Mar. 24, 2022

(51) Int. Cl.
*G06F 12/00* (2006.01)
*G06F 12/0882* (2016.01)
*G06F 12/0891* (2016.01)
*G06F 12/0817* (2016.01)
*G06F 12/1009* (2016.01)
*G06F 13/16* (2006.01)
*G06F 12/02* (2006.01)

(52) U.S. Cl.
CPC ...... *G06F 12/0882* (2013.01); *G06F 12/0238* (2013.01); *G06F 12/0824* (2013.01); *G06F 12/0891* (2013.01); *G06F 12/1009* (2013.01); *G06F 13/1668* (2013.01); *G06F 2212/7207* (2013.01)

(58) Field of Classification Search
CPC ............ G06F 12/0882; G06F 12/0238; G06F 12/0824; G06F 12/0891; G06F 12/1009; G06F 13/1668; G06F 2212/7207
See application file for complete search history.

(56) References Cited

U.S. PATENT DOCUMENTS

| | | | | |
|---|---|---|---|---|
| 2004/0034743 | A1* | 2/2004 | Wolrich | ................ H04L 49/901 |
| | | | | 711/132 |
| 2007/0136523 | A1* | 6/2007 | Bonella | ................. G06F 9/4401 |
| | | | | 711/113 |
| 2009/0094430 | A1* | 4/2009 | Bergheaud | .............. G06F 9/526 |
| | | | | 711/163 |
| 2017/0242612 | A1* | 8/2017 | Kimberly | ............ G06F 12/0246 |
| 2019/0004968 | A1* | 1/2019 | Gao | ..................... G06F 12/0871 |

* cited by examiner

*Primary Examiner* — Gurtej Bansal
(74) *Attorney, Agent, or Firm* — Foley & Lardner LLP (57) ABSTRACT

A device for processing commands to manage non-volatile memory includes a controller configured to obtain address information from a command, read, based on the address information, an entry of a metadata table, and determine, based on the entry of the metadata table, whether a metadata page corresponding to the address information is being processed by the controller. In response to determining that the metadata page corresponding to the address information is being processed, the controller determines a processing status of the metadata page, among a plurality of processing statuses, based on the entry of the metadata table and processes the command according to the processing status of the first metadata page. In response to determining that the metadata page corresponding to first address information is not being processed, the controller reads the metadata page from the non-volatile memory based on the entry of the metadata table.

20 Claims, 6 Drawing Sheets

SYSTEM AND METHOD FOR SCALING COMMAND ORCHESTRATION THROUGH ADDRESS MAPPING

TECHNICAL FIELD

The present embodiments relate generally to system and method for operating a data storage device by processing commands to manage non-volatile memory, and more particularly to system and method for processing commands to manage non-volatile memory using address mapping to scale command orchestration.

BACKGROUND

Storage devices can read data blocks in non-volatile memory via logical-to-physical address mapping. Upon receiving multiple commands requesting for reads of data blocks, a storage device can perform command orchestration to issue multiple reads in an order. Given limited capacity of volatile memory and limited processing power of a storage device, improvements in efficient and scalable command orchestration remain desired.

SUMMARY

The present embodiments relate to system and method for processing commands to manage non-volatile memory using address mapping to scale command orchestration.

According to certain aspects, embodiments provide a device for processing commands to manage non-volatile memory. The device may include a controller and volatile memory. The controller may be configured to obtain first address information from a first command. The controller may be configured to read, based on the first address information, a first entry of a metadata table. The controller may be configured to determine, based on the first entry of the metadata table, whether a first metadata page corresponding to the first address information is being processed by the controller. The controller may be configured to, in response to determining that the first metadata page corresponding to the first address information is being processed, determine a first processing status of the first metadata page, among a plurality of processing statuses, based on the first entry of the metadata table and process the first command according to the first processing status of the first metadata page. The controller may be configured to, in response to determining that the first metadata page corresponding to the first address information is not being processed, read the first metadata page from the non-volatile memory based on the first entry of the metadata table.

According to other aspects, embodiments provide a method of processing commands to manage non-volatile memory. The method may include obtaining, by a processor, first address information from a first command. The method may include reading, by the processor based on the first address information, a first entry of a metadata table. The method may include determining, by the processor based on the first entry of the metadata table, whether a first metadata page corresponding to the first address information is being processed by the controller. The method may include in response to determining that the first metadata page corresponding to the first address information is being processed, determining by the processor a first processing status of the first metadata page, among a plurality of processing statuses, based on the first entry of the metadata table and process the first command according to the first processing status of the first metadata page. The method may include in response to determining that the first metadata page corresponding to the first address information is not being processed, reading, by the processor, the first metadata page from the non-volatile memory based on the first entry of the metadata table.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

According to certain aspects, embodiments in the present disclosure relate to techniques for processing commands to manage non-volatile memory using address mapping to scale command orchestration.

With a high performance system it is important to avoid performance bottlenecks. Parallelizing operations may lead to unexpected race conditions that often become either bottlenecks or bugs. With a paging FTL (Flash Translation Layer), multiple requests for reads or writes may result in the need to load a page, causing a problem in scaling command orchestration or ordering. For example, both reads and write may require loading the same metadata pages (or MDPages) that contain mapping information. One solution for this problem is to keep a sorted list of pages being loaded in a fetch process in order to determine which pages are being loaded or processed. For example, red-black tree can be used to maintain a searchable sorted list with computation complexity of $O(\log2 N)$ where N is the number of nodes of the tree (or the number of pages). This solution, however, may lead to a high design complexity and improvements are desired in terms of performance and scalability. For a paging system, there is a general scalability problem of tracking state of active pages. These active pages could have many different states (beyond loading) requiring tracking which this invention solves.

To solve this problem, according to certain aspects, embodiments in the present disclosure relate to techniques for using address mapping to track active operations and perform command orchestration accordingly. In some embodiments, a command orchestration system (e.g., FTL) may take advantage of a large map (e.g., metadata map) in memory. Instead of storing a value in a metadata map which indicates a location of a page (e.g., metadata page) in non-volatile memory (e.g., flash memory), the command orchestration system can replace the value with special set up values that indicate that the page is already in a load process.

In some embodiments, a metadata map (MDMap) may be an in-memory table used to track a location in non-volatile memory for a given (metadata) page. In some embodiments, the metadata map may include mapping information between an address provided for data (e.g., logical address) and an address of physical memory at which the data or a metadata page for the data is stored (e.g., "physical address"). In some embodiments, the metadata map may have a plurality of entries each of which contains an address of a metadata page (MDPage) including mapping information (metadata) for a given metadata page number. In some embodiments, a portion of the address space defined by the metadata map may not be used for addresses in non-volatile memory, and this unused portion of the address space can be instead allocated for use by orchestration management. In some embodiments, when a metadata page is in a read fetch, a command orchestration system may use address redirection by using, instead of using the address of the metadata page, an address value that corresponds to an execution tag (ExecTag) used to issue and track the read process. In some embodiments, the execution tag may be associated with an address in an unused portion of the address space defined by the metadata map.

In some embodiments, the execution tag may have a linked list of requests pending the read of the metadata page. For example, when a new request arrives, a conventional FTL may attempt to lookup the flash address in the metadata map to issue a read for the corresponding (metadata) page. A command orchestration system according to some embodiments can instead perform lookup to find a value that indicates that a read for a metadata page is already in process and can instead add the request to an appropriate linked list. In some embodiments, on completion of a metadata read operation (MDRead), the command orchestration system can service the queued requests can be serviced based on that linked list.

In some embodiments, a command orchestration system may apply this modified address mapping technique to different phases of a command orchestration process such as on chip cache/buffer or trim state. In some embodiments, a background trim operation can be managed using this modified address mapping technique. For example, when a metadata page is subject to a background trim operation, a command orchestration system may use address redirection by using, instead of using the address of the metadata page, an address value that corresponds to a trim tag (TrimTag) used to track the trim process. In some embodiments, the command orchestration system can handle pages for a metadata pack unit into which at least two commands are grouped. For example, when metadata pages are being processed in a metadata pack unit, a command orchestration system may use address redirection by using an address value that corresponds to a pack tag (PackTag) used to track the metadata pack process.

In some embodiments, the command orchestration system can handle pages stored in a memory cache (e.g., DRAM). For example, when a metadata page is stored in a cache, a command orchestration system may use address redirection by using an address value that corresponds to a read cache tag (RdCacheTag) which indicates where in DRAM the metadata page is, as a fully associative caching mechanism, for example. Similarly, when a metadata page stored in a cache has been modified but not been written to the non-volatile memory (e.g., the page is dirty), a command orchestration system may use address redirection by using an address value that corresponds to a write cache tag (WrCacheTag) which indicates where in DRAM additional information on the dirty metadata page is. In some embodiments, execution tags, trim tags, pack tags, read cache tags, write cache tags may be defined as respective unused portions of the address space defined by the metadata map.

According to certain aspects, embodiments in the present disclosure relate to a device for processing commands to manage non-volatile memory. The device may include a controller and volatile memory. The controller may be configured to obtain first address information from a first command. The controller may be configured to read, based on the first address information, a first entry of a metadata table. The controller may be configured to determine, based on the first entry of the metadata table, whether a first metadata page corresponding to the first address information is being processed by the controller. The controller may be configured to, in response to determining that the first metadata page corresponding to the first address information is being processed, determine a first processing status of the first metadata page, among a plurality of processing statuses, based on the first entry of the metadata table and process the first command according to the first processing status of the first metadata page. The controller may be configured to, in response to determining that the first metadata page corresponding to the first address information is not being processed, read the first metadata page from the non-volatile memory based on the first entry of the metadata table.

According to certain aspects, embodiments in the present disclosure relate to method of processing commands to manage non-volatile memory. The method may include obtaining, by a processor, first address information from a first command. The method may include reading, by the processor based on the first address information, a first entry of a metadata table. The method may include determining, by the processor based on the first entry of the metadata table, whether a first metadata page corresponding to the first address information is being processed by the controller. The method may include in response to determining that the first metadata page corresponding to the first address information is being processed, determining by the processor a first processing status of the first metadata page, among a plurality of processing statuses, based on the first entry of the metadata table and process the first command according to the first processing status of the first metadata page. The method may include in response to determining that the first metadata page corresponding to the first address information is not being processed, reading, by the processor, the first metadata page from the non-volatile memory based on the first entry of the metadata table.

Embodiments in the present disclosure have at least the following advantages and benefits.

Embodiments in the present disclosure can provide useful techniques for using modified address mapping to improve command orchestration. With the modified address mapping techniques by replacing a flash address with a value (tag) corresponding to the processing status, a command orchestration system according to some embodiments can determine which pages are in a load process (or other processes) in computation complexity O(1). This method of command orchestration can also achieve better scalability and less design complexity than conventional techniques (e.g., those using the red-black tree). Moreover, by adding a cache tag to the map address space, a command orchestration system according to some embodiments can achieve even higher performance and scalability through fully associative cache instead of n-way cache. The command orchestration system also can use the replaced value to reference lists and other data as necessary so as to efficiently track the operation process associated with a target metadata page. These improvements can provide additional benefits and simplifications for Key-Value storage system which have significantly larger amounts of metadata than typical for legacy namespace/logical addressing.

Figure 1:
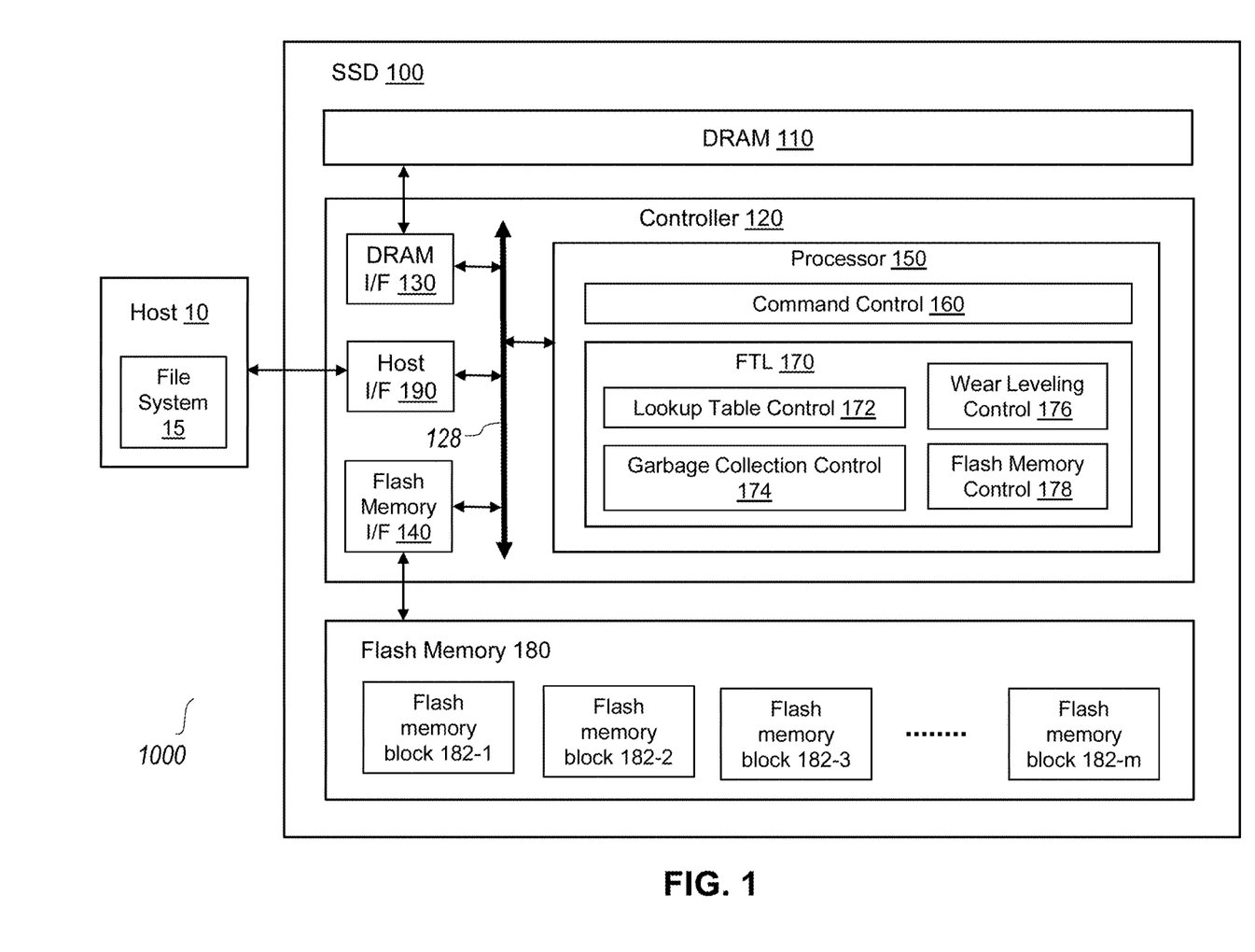
FIG. 1 is a block diagram illustrating an example computer system according to some embodiments.

FIG. 1 is a block diagram illustrating an example computer system according to some embodiments.

Referring to FIG. 1, a computer system 1000 may include a host 10 and a solid-state drive (SSD) 100, which is a storage device and may be used as a main storage of an information processing apparatus (e.g., the host 10). The SSD 100 may be incorporated in the information processing apparatus or may be connected to the information processing apparatus via a cable or a network.

The host 10 may be an information processing apparatus (computing device) that accesses the SSD 100. The host 10 may be a server (storage server) that stores a large amount of various data in the SSD 100, or may be a personal computer. The host includes a file system 15 used for controlling file operation (e.g., creating, saving, updating, or deleting). For example, ZFS, Btrfs, XFS, ext 4, or NTFS may be used as the file system 15. Alternatively, a file object system (e.g., Ceph Object Storage Daemon) or a key value store system (e.g., RocksDB) may be used as the file system 15.

The SSD 100 includes, for example, a controller 120 and a flash memory 180 as non-volatile memory (e.g., a NAND type flash memory). The SSD 100 may include a random access memory which is a volatile memory, for example, DRAM (Dynamic Random Access Memory) 110. In some embodiments, the controller 120 may include a random access memory such as SRAM (Static Random Access Memory). The random access memory such as the DRAM 110 has, for example, a read buffer which is a buffer area for temporarily storing data read out from the flash memory 180, a write buffer which is a buffer area for temporarily storing data written in the flash memory 180, and a buffer used for a garbage collection. In some embodiments, the controller 120 may include the DRAM 110.

In some embodiments, the flash memory 180 may include a memory cell array which includes a plurality of flash memory blocks (e.g., NAND blocks) 182-1 to 182-m. Each of the blocks 182-1 to 182- may function as an erase unit. Each of the blocks 182-1 to 182-m includes a plurality of physical pages. In some embodiments, in the flash memory 180, data reading and data writing are executed on a page basis, and data erasing is executed on a block basis.

In some embodiments, the controller 120 may be a memory controller configured to control the flash memory 180. The controller 120 includes, for example, a processor (e.g., CPU) 150, a flash memory interface 140, and a DRAM interface 130, a host interface 190, all of which may be interconnected via a bus 128. The DRAM interface 130 may function as a DRAM controller configured to control an access to the DRAM 110. The flash memory interface 140 may function as a flash memory control circuit (e.g., NAND control circuit) configured to control the flash memory 180 (e.g., NAND type flash memory).

The host interface 190 may function as a circuit which receives various requests from the host 15 and transmits responses to the requests to the host 10. The requests may include various commands such as an I/O command and a control command. The I/O command may include, for example, a write command, a read command, a trim command (unmap command), a format command, and a flush command. The write command is also called a program command. The format command may be a command for unmapping the entire memory system (SSD 100).

The processor 150 may be configured to control the flash memory interface 140, and the DRAM interface 130. The processor 150 may be configured to perform various processes by executing a control program (e.g., firmware) stored in, for example, a ROM (not shown). In some embodiments, the processor 150 may perform a command control 160 to execute command processing for processing various commands received from an information processing apparatus (e.g., a host computer).The processor 150 may be configured to function as a flash translation layer (FTL) 170 to execute data management and block management of the flash memory 180. The FTL 170 may include a look-up table control 172, a garbage collection control 174, a wear leveling control 176, and a flash memory control 178. The data management may include management of mapping information indicating a correspondence relationship between a logical address (e.g., LBA (logical block address)) and a physical address of the flash memory 180. In some embodiments, the look-up table control 172 may execute management of mapping between (1) each logical block address (LBA) or each logical page address and (2) each physical address using an address translation table (logical/physical address translation table; e.g., a metadata map 230, 330 in FIGS. 2 and 3). The FTL 170 may function as a command orchestration system (e.g., command orchestration system 2000 or 3000 in FIGS. 2 and 3) to execute multiple reads in an order by managing a metadata map (e.g., a metadata map 230, 330 in FIGS. 2 and 3) and a plurality of queues (e.g., queue 366 in FIGS. 3A and 3B). The garbage collection control unit 174 may execute garbage collection (GC) which is a process executed to generate a free block as a data write destination block. The wear leveling control 176 may execute wear leveling which is a process of leveling the number of times of block erasure so that by preventing an occurrence of blocks with a larger number of erasures, the failure probability of the SSD 100 can be reduced. The flash memory control unit 178 may execute control of the flash memory interface 140.

Figure 2:
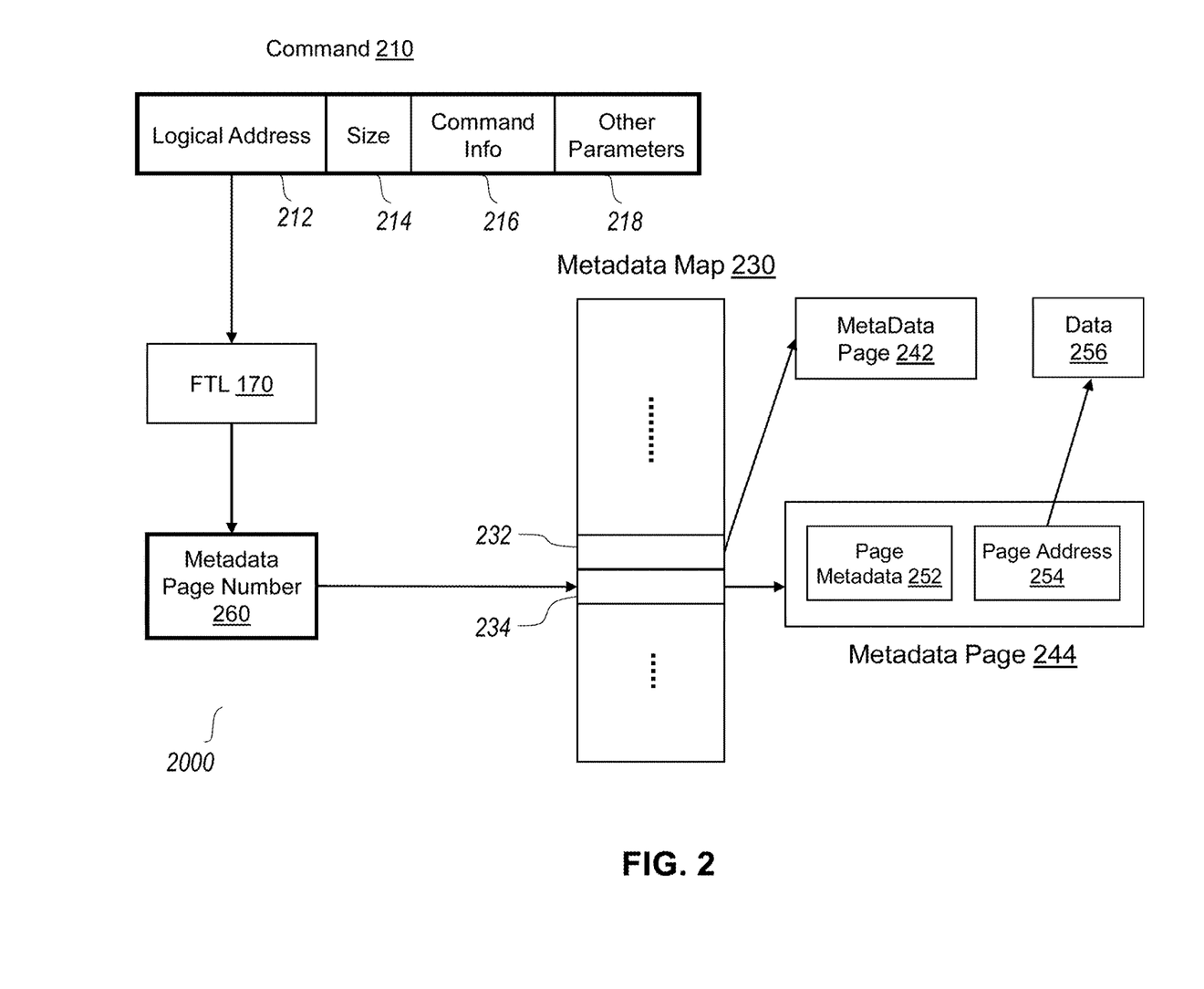
FIG. 2 is a block diagram illustrating an example command orchestration system using address mapping, according to some embodiments.

FIG. 2 is a block diagram illustrating an example command orchestration system using address mapping, according to some embodiments. Referring to FIG. 2, a command orchestration system 2000 may use address mapping to track active operations and perform command orchestration accordingly. In some embodiments, the command orchestration system 2000 may include a flash translation layer (e.g., FTL 170 in FIG. 1) and take advantage of a metadata map 230 for address mapping. In some embodiments, the metadata map 230 may be an in-memory table (e.g., stored in volatile memory like DRAM 110 in FIG. 1) used to track a location in non-volatile memory for a given (metadata) page. In some embodiments, the metadata map may have a plurality of entries (e.g., entries 232, 234) each of which contains a flash address of a metadata page (MDPage) including mapping information (or metadata) for a given metadata page number (e.g., a metadata page number 260) .For example, a flash memory system (e.g., SSD 100 in FIG. 10) may receive from a computing device (e.g., host 10 in FIG. 1), a command 210 which may include command information 216 (e.g., whether it is a read command, a write command, etc.), logical address information 212 and size 214 of data, or other parameter information 218. The FTL may determine a metadata page number 260 of the data based on the command 210. The FTL may lookup the metadata map 230 with the metadata page number 260 as an index to locate the entry 234 containing a physical (flash memory) address of a metadata page 244 corresponding to the data. Similarly, the entry 232 of the metadata map may contain a physical (flash memory) address of a metadata page 244. In some embodiments, the metadata page 244 may include a physical address 254 of a page in non-volatile memory (e.g., flash memory 180 in FIG. 1) indicating a location of target data 256. In some embodiments, the metadata page 244 may include other metadata 252, for example, at least one of block status, data status, ECC (Error Correction Code) of the content of a block, or information related to the content (file id, page id, byte count, version, or ECC).

Figure 3A:
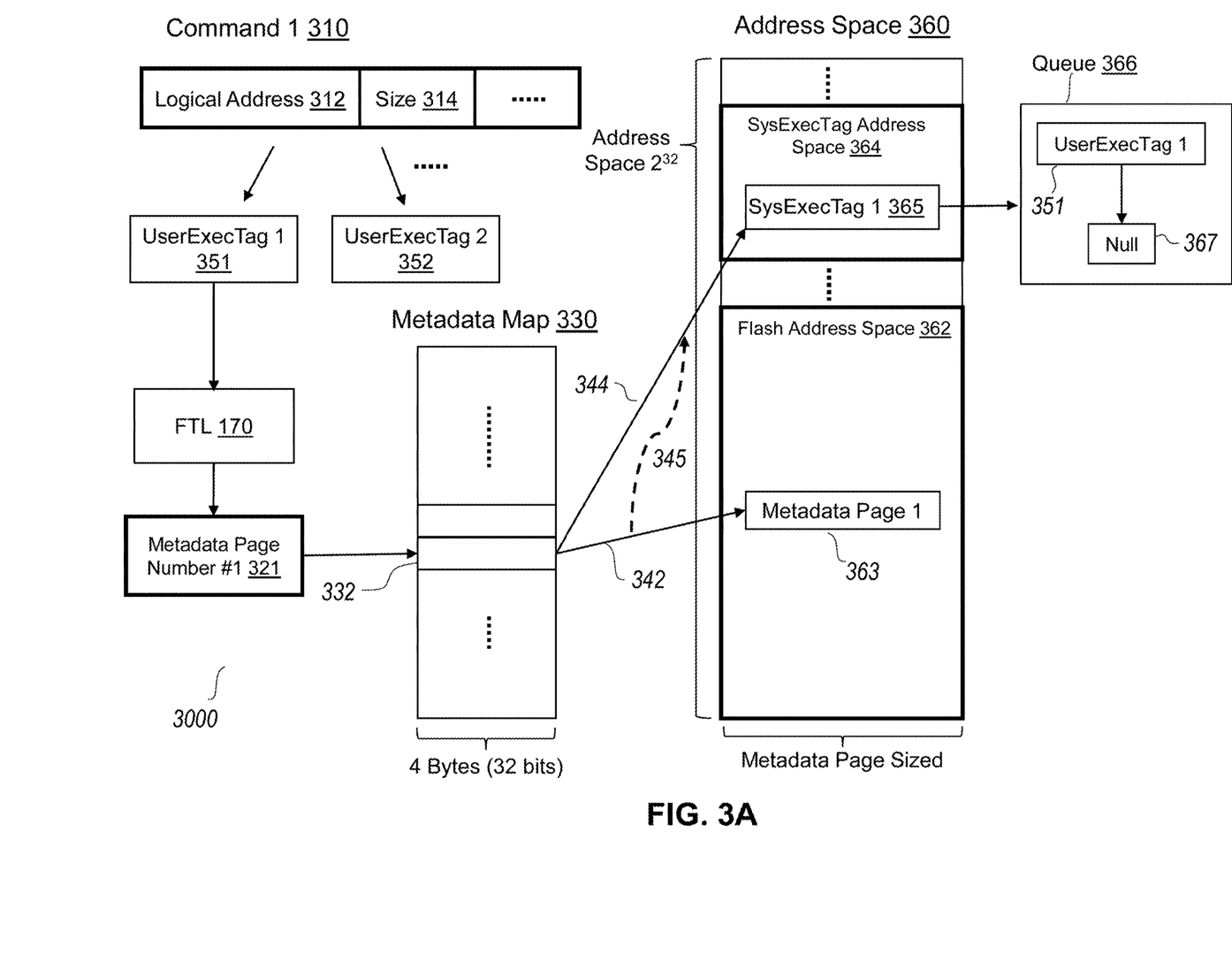
FIG. 3A and FIG. 3B illustrate an example process of performing command orchestration using address mapping, according to some embodiments.

FIG. 3A and FIG. 3B illustrate an example process of performing command orchestration using address mapping, according to some embodiments. Referring to FIG. 3A, in some embodiments, instead of storing a value in a metadata map which indicates a location of a page (e.g., metadata page) in non-volatile memory (e.g., flash memory 180 in FIG. 1), a command orchestration system 3000 may replace the location value with special set up values that indicate that the page is already in a load process or is being processed in other processes. In some embodiments, the command orchestration system 3000 may be implemented with a controller of a flash memory system (e.g., controller 120 in FIG. 1). For example, a flash memory system (e.g., SSD 100 in FIG. 1) may receive from the host 10 (see FIG. 1), a command 310 including logical address information 312 and size 314 of data. The flash memory system may allocate or create an appropriate number of user execution tags, denoted by UserExecTags (351, 352, etc.), based on data size indicated by command 314 to track execution of the command 310 to allow parallel execution of the command. For example, the number of user execution tags may be determined based on the command size and a predetermined page size so that each user execution tag can contain information for accessing a corresponding page or metadata page. In some embodiments, a user execution tag may include information for executing the command (or part thereof) with the corresponding page. In some embodiments, an FTL (e.g., FTL 170) or a command control (e.g., command control 160 in FIG. 1) of the flash memory system may allocate the number of the user execution tags. The FTL may determine a metadata page number #1 (321) of the data based on the user execution tag 351. The FTL then may lookup a metadata map 330 with the metadata page number 321 as an index to locate an entry 332 which may contain a physical (flash memory) address 342 of a metadata page 1 (363) corresponding to the data for the command 310. In some embodiments, the command orchestration system 3000 may allocate a system execution tag (e.g., 365), denoted by SysExecTag, to perform a read (MDRead) of the metadata page 1 (363) to be loaded in volatile memory (e.g., DRAM 110 in FIG. 1). The command orchestration system 3000 then may replace (indicated by a dotted line denoted by 345) the current address value contained in the entry 332 with an address 344 of a system execution tag address space (SysExecTag address space) 364. In some embodiments, the SysExecTag address space 364 may be a portion of the address space defined by the metadata map (e.g., 232 total address space as shown in FIG. 3A) that is not used for addresses in the non-volatile memory, e.g., outside of a flash address space 362. This unused portion 364 of the address space can be instead allocated for use by orchestration management.

In some embodiments, in response to determining that the metadata page 363 is in a read fetch, the command orchestration system 3000 may use address redirection by using, instead of using the flash address 342 of the metadata page, the address value 344 that corresponds to an system execution tag (SysExecTag) 1 (365) used to issue and track the read process, for example. In some embodiments, the system execution tag 1 (365) may be associated with the address 344 in an unused portion (e.g., SysExecTagTag address space 364) of the address space defined by the metadata map 330. In some embodiments, the system execution tag may have or point to a queue 366 of UserExecTag requests pending the read of the metadata page. In some embodiments, the queue 366 may be stored in volatile memory separate from a memory location of the SysExecTag 365, such that the system execution tag 365 contains a memory address of the queue 366. In some embodiments, the queue 366 may be managed using a separate table indexed by SysExecTag 365. In some embodiments, the queue 366 may be replaced by any implementation of a FIFO (First-In-First-Out) data structure that can perform queue operations (e.g., enqueuing and dequeuing) in O(1) time., e.g., array, singly linked list, or doubly linked list, etc. In some embodiments, in response to determining that there is no request pending the read of the metadata page 1, the queue 366 may be empty as it only contains a null value 367. In some embodiments, as shown in FIG. 3A, after the command orchestration system allocates SysExecTag 1 (365) and issues the read of the metadata page 363, UserExecTag 1 (351) can be placed on or added to the queue 366 (or any FIFO data structure associated with SysExecTag 365) to be serviced or processed once the read is complete. After the command orchestration system completes service or processing of UserExecTag 1 (351), e.g., by executing the command 310 (or part thereof) with the metadata page 363, UserExecTag 1 (351) can be removed from the queue 366 (or any FIFO data structure associated with SysExecTag 365).

In some embodiments, there may be no non-volatile memory space allocated to the address of the system execution tag (because the system execution tag address space is outside of the flash address space), and the system execution tag can be stored in volatile memory (e.g., DRAM 110 in FIG. 1). In some embodiments, the address of the system execution tag in the volatile memory may be associated with the address 344 contained in the entry 332 of the metadata map 330. In other words, the command orchestration system can calculate the address of the system execution tag in the volatile memory based on the address 344 contained in the entry 332 of the metadata map 330. For example, the address of the system execution tag in the volatile memory can be calculated based on an offset of the address 344 from the start address of the SysExecTag address space 364. In some embodiments, the execution tag may include information on a process to which the metadata page is currently subject (e.g., a process id of the process, or kind of the process such as a read process, a write process, etc.) and/or information on access to the metadata page (e.g., the address of the metadata page loaded in the volatile memory).

Figure 3B:
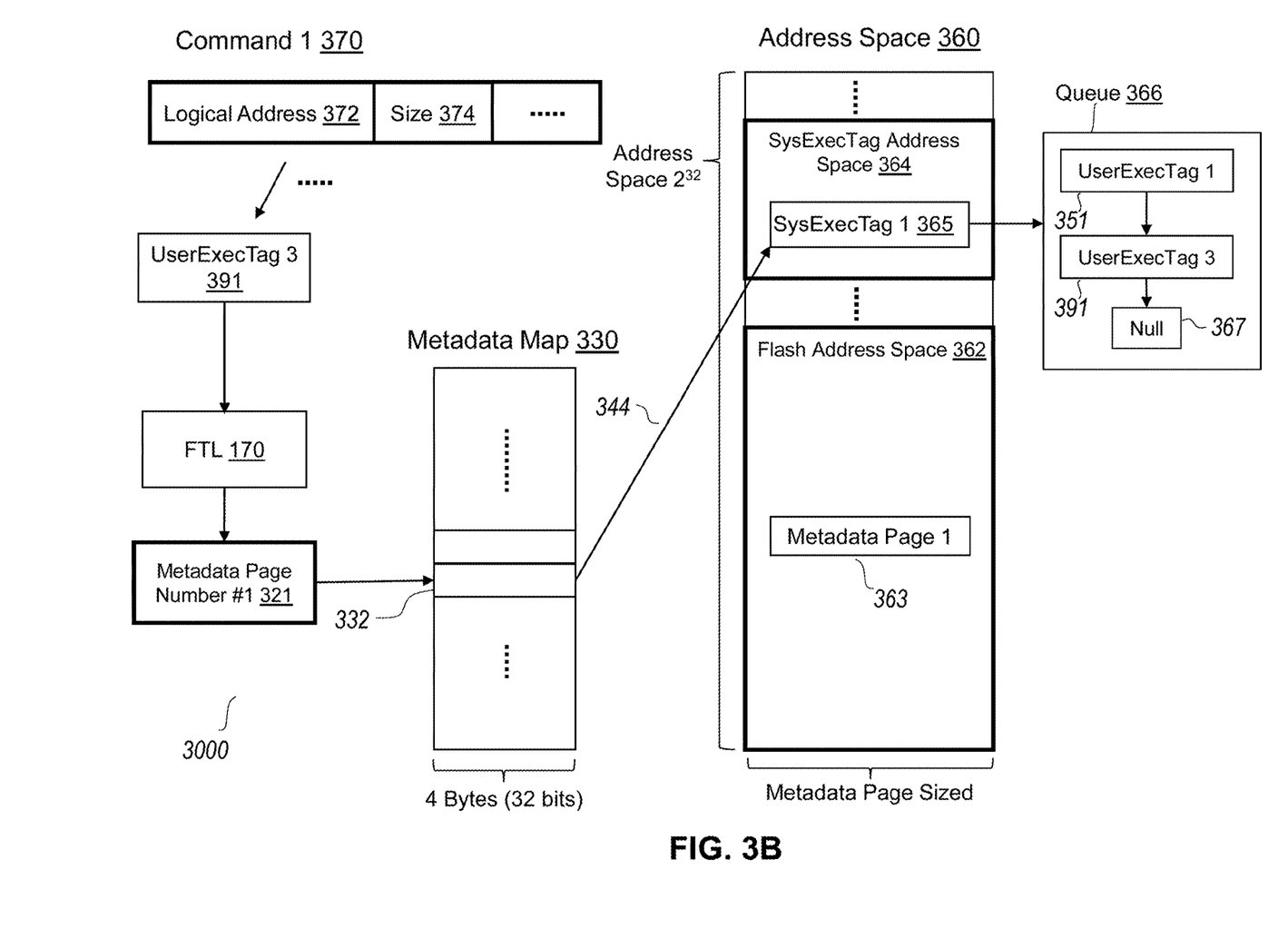

Referring to FIG. 3B, for example, when a new user execution tag request arrives, the command orchestration system 3000 according to some embodiments can perform lookup to the metadata map to find a value that indicates that a read for a metadata page is already in process and can instead add the request to an appropriate queue or any FIFO data structure (e.g., linked list). For example, further to receiving the command 1 (310) from the host 10 (see FIG. 3A), the flash memory may receive another command 370 including logical address information 372 and size 374 of data. The system may allocate a user execution tag 3, or UserExecTag 3 (391). Based on the command 370 and UserExecTag 3 (391), the FTL 170 may determine that the command 370 requests the same metadata page number #1 (321) of the data as the command 310 previously did (see FIG. 3A). The FTL then may lookup the metadata map 330 with the metadata page number 321 as an index to locate the entry 332. Now, the entry 332 of the metadata map may contain the address 344 of the SysExecTag address space 364, instead of the flash memory address of the metadata page 1 (363) corresponding to the data. In some embodiments, the command orchestration system 3000 may identify or locate or access the system execution tag 1 (365) based on the address 344 of the SysExecTag address space 364, for example, by calculating the address of the system execution tag 1 in the volatile memory based on an offset of the address 344 from the start address of the SysExecTag address space 364.

In some embodiments, the command orchestration system 3000 may determine that the address 344 is within the SysExecTag address space 364. In response to the determination, the system may recognize that a read operation (MDRead) for the metadata page 1 is already in process (but is not completed yet), by determining that the queue 366 as shown in FIG. 3A has UserExecTag 1 (351). The command orchestration system 3000 then may add the current request UserExecTag 3 (391) (from the command 2) to the queue 366. In some embodiments, on completion of the read operation for the metadata page 1, the command orchestration system may remove the UserExecTag 1 (351) from the queue 366, then service or process UserExecTag 1 (351), then remove the UserExecTag 3 (391) from the queue 366, then service or process UserExecTag 3 (391). In response to determining that the service or process of UserExecTag 3 (391) is completed, the command orchestration system may determine that the queue 366 is empty as it only contains the null value 367. In some embodiments, in response to determining that the queue 366 is empty, the command orchestration system may update the entry 332 of the metadata map 330 with the address 342 of the metadata page 1 (363) (see FIG. 3A).

Figure 4:
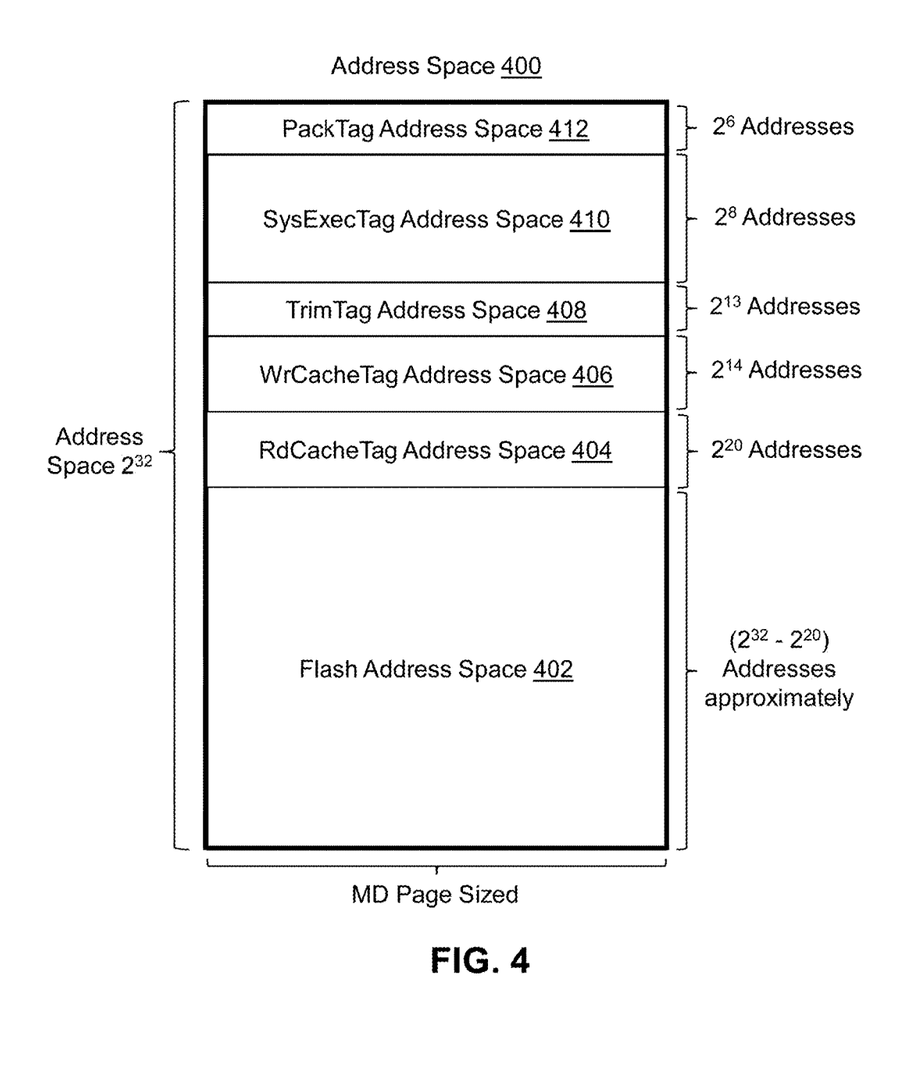
FIG. 4 is a block diagram illustrating an example of address mapping for command orchestration, according to some embodiments.

FIG. 4 is a block diagram illustrating an example of address mapping for command orchestration, according to some embodiments. A command orchestration system according to some embodiments may apply the modified address mapping technique (as shown in FIGS. 2, 3A and 3B) to different phases of a command orchestration process such as pack or trim or cache.

In some embodiments, execution tags, trim tags, pack tags, read cache tags, write cache tags may be defined as respective unused portions of the address space defined by a metadata map. For example, referring to FIG. 4, an address space 400 defined by 4 byte size entries of a metadata map (address space of $2^{32}$) may include a pack tag (PackTag) address space 412 having $2^6$ addresses in which pack tags (PackTag) can indicate that corresponding metadata pages are processed in a metadata pack unit into which at least two commands are grouped. The address space 400 may include a system execution tag (SysExecTag) address space 410 having $2^8$ addresses in which system execution tags (SysExecTag) can indicate which read process is loading corresponding metadata pages, as illustrated in FIGS. 3A and 3B. The address space 400 may include a trim tag (TrimTag) address space 408 having $2^{13}$ addresses in which trim tags (TrimTag) can indicate that corresponding metadata pages are in a background trim operation. The address space 400 may include a write cache tag (WrCacheTag) address space 406 having $2^{14}$ addresses in which write cache tags (WrCacheTag) can indicate where in volatile memory (e.g., DRAM 110 in FIG. 1) corresponding dirty metadata pages are. The address space 400 may include a read cache tag (RdCacheTag) address space 404 having $2^{20}$ addresses in which read cache tags (RdCacheTag) can indicate where in DRAM corresponding metadata pages are. The address space 400 may include a flash address space 402 having approximately $2^{32}-2^{20}$ addresses that can indicate flash locations containing metadata pages.

In some embodiments, a background trim operation can be managed using the modified address mapping technique similar to those illustrated in FIGS. 3A and 3B. For example, when a metadata page is subject to a background trim operation, a command orchestration system may use address redirection by using, instead of using the flash address of the metadata page in a flash address space (e.g., the flash address space 402 in FIG. 4), an address value of a trim tag address space (e.g., the trim tag address space 408 in FIG. 4) that corresponds to a trim tag (TrimTag) used to track the trim process. Upon receiving a request for particular data which is currently subject to a background trim process, the command orchestration system can recognize or track the trim process in which the metadata page is, based on a trim tag associated with the metadata page for the particular data.

In some embodiments, the command orchestration system can handle pages for a metadata pack unit into which at least two comments are grouped. For example, when metadata pages are being processed in a metadata pack unit, a command orchestration system may use address redirection by using an address value of a pack tag address space (e.g., the pack tag address space 412 in FIG. 4) that corresponds to a pack tag (PackTag) used to track the command pack process. Upon receiving a request for particular data which is currently subject to a pack process for grouping two or more commands into a pack command unit, the command orchestration system can recognize or track the pack process in which the metadata page is, based on a pack tag associated with the metadata page for the particular data.

In some embodiments, the command orchestration system can handle pages stored in a memory cache (e.g., DRAM 110 in FIG. 1). For example, when a metadata page is stored in a cache, a command orchestration system may use address redirection by using an address value of a read cache tag address space (e.g., the read cache tag address space 404 in FIG. 4) that corresponds to a read cache tag (RdCacheTag) which indicates where in the cache (e.g., DRAM) the metadata page is. In some embodiments, the command orchestration system can calculate the address of the metadata page stored in the cache based on the redirected address in the read cache tag address space 404. For example, the address of the metadata page stored in the cache can be calculated based on an offset of the redirected address from the start address of the read cache tag address space 404.

In some embodiments, when a metadata page stored in a cache (e.g., DRAM 110 in FIG. 1) has been modified but not been written to the non-volatile memory (e.g., the page is dirty), a command orchestration system may use address redirection by using an address value of a write cache tag address space (e.g., the write cache tag address space 406 in FIG. 4) that corresponds to a write cache tag (WrCacheTag) which indicates where in the cache (e.g., DRAM) the dirty metadata page is. In some embodiments, the command orchestration system can calculate the address of the dirty metadata page stored in the cache based on the redirected address in the write cache tag address space 406. For example, the address of the dirty metadata page stored in the cache can be calculated based on an offset of the redirected address from the start address of the write cache tag address space 406. In some embodiments, upon writing the metadata page to the non-volatile memory, the command orchestration system may update the entry of a metadata map corresponding to the metadata page with an address value of the flash address in response to determining that the metadata page is removed from the cache, or with an address value of the read cache address in response to determining that the (clean) metadata page remains.

In some embodiments, a device (e.g., SSD 110 in FIG. 1) for processing commands (e.g., commands 210, 310, 370 in FIGS. 2, 3A and 3B) to manage non-volatile memory (e.g., flash memory 180 in FIG. 1) may include a controller (e.g., controller 120 in FIG. 1) and volatile memory (e.g., DRAM 110 in FIG. 1). The controller may be configured to obtain first address information (e.g., logical address information 312, 352 in FIGS. 3A and 3B) from a first command (e.g., command 310, 320 in FIGS. 3A and 3B). The controller may be configured to read, based on the first address information, a first entry of a metadata table (e.g., entry 332 of metadata map 330 in FIG. 3A). The controller may be configured to determine, based on the first entry of the metadata table (e.g., address 342 in flash address space 362 or address 344 in system execution tag address space 364 in FIG. 3A), whether a first metadata page corresponding to the first address information is being processed by the controller. The controller may be configured to, in response to determining that the first metadata page corresponding to the first address information is being processed (e.g., when the entry contains an address 344 in system execution tag address space 364 in FIG. 3B), determine a first processing status (e.g., a status of being loaded as indicated by execution tag 365 in FIG. 3B) of the first metadata page, among a plurality of processing statuses, based on the first entry of the metadata table (e.g., entry 332 of metadata map 330 in FIG. 3B) and process the first command according to the first processing status of the first metadata page (e.g., add to a queue 366 a request from the command 2 in FIG. 3B). The controller may be configured to, in response to determining that the first metadata page corresponding to the first address information is not being processed (e.g., when the entry 332 contains an address 342 in flash address space 362 in FIG. 3A), read the first metadata page 363 from the non-volatile memory based on the first entry of the metadata table (e.g., the address 342 contained in the entry 332 in FIG. 3A).

In some embodiments, the metadata table (e.g., metadata map 230, 330 in FIGS. 2, 3A and 3B) may be stored in the volatile memory (e.g., DRAM 110 in FIG. 1). In some embodiments, the plurality of processing statuses (e.g., statuses indicated by a plurality of tags as shown in FIG. 4) may include at least one of status of loading for a read operation (e.g., ExecTag in FIG. 4), status of loading for a trim operation (e.g., TrimTag in FIG. 4), status of loading for a pack operation (e.g., PackTag in FIG. 4), status of page in a cache (e.g., RdCacheTag in FIG. 4), or status of dirty page in a cache (e.g., WrCacheTag in FIG. 4).

In some embodiments, in determining whether the first metadata page is being processed by the controller, the controller may be configured to determine a first address (e.g., address 342 or address 344 in FIGS. 3A and 3B) based on the first entry (e.g., entry 332 in FIGS. 3A and 3B). The controller may be configured to, in response to determining that the first address (e.g., address 342 in FIG. 3A) is within an address space of the non-volatile memory (e.g., flash address space 362 in FIGS. 3A and 3B), determine that the first metadata page (e.g., metadata page 1 (363) in FIG. 3A) is not being processed. The controller may be configured to, in response to determining that the first address (e.g., address 344 in FIG. 3B) is outside of an address space of the non-volatile memory (e.g., system execution tag address space 364 which is outside of flash address space 362 in FIG. 3B), determine that the first metadata page is being processed. In some embodiments, each of the plurality of processing statuses may be associated with a respective address space (e.g., pack tag address space 412, system execution tag address space 410, trim tag address space 408, write cache tag address space 406, read cache tag address space 404 in FIG. 4) that is outside of an address space of the non-volatile memory. In some embodiments, in determining the first processing status of the first metadata page, the controller may be configured to determine a first address (e.g., address 344 in FIG. 3B) based on the first entry (e.g., entry 332 in FIG. 3B), and determine that the first address (e.g., address 344 in FIG. 3B) is within the address space associated with the first processing status (e.g., the system execution tag address space 364 in FIG. 3B).

In some embodiments, the controller may be configured to create a first queue of requests (e.g., queue 366 in FIG. 3A) for the first metadata page (e.g., metadata page 1 (363) in FIG. 3A). The controller may be configured to, in response to determining that the first metadata page is being processed, add to the first queue (e.g., queue 366 in FIG. 3B) a request (e.g., request 368 in FIG. 3B) corresponding to the first command (e.g., command 2 (370) in FIG. 3B). The controller may be configured to determine whether a current processing of the first metadata page is completed. The controller may be configured to, in response to determining that the current processing of the first metadata page is completed, remove a request from the first queue (e.g., queue 366 in FIG. 3B) and process the removed request (e.g., request 368 in FIG. 3B) by reading the first metadata page (e.g., metadata page 1 (363) in FIG. 3B). The controller may be configured to determine whether a current processing of the first metadata page is completed. In response to determining that the current processing of the first metadata page is completed, the controller may be configured to determine that the first queue is empty. In response to determining that the first queue is empty, the controller may be configured to update the first entry of the metadata table (e.g., entry 332 of metadata map 330 in FIG. 3B) with an address of the non-volatile memory indicating a location of the first metadata page (e.g., address of the metadata page 1 (363) in FIG. 3B). In some embodiments, the first queue may be a linked list (e.g., linked list implementation of queue 366 in FIG. 3B).

Figure 5:
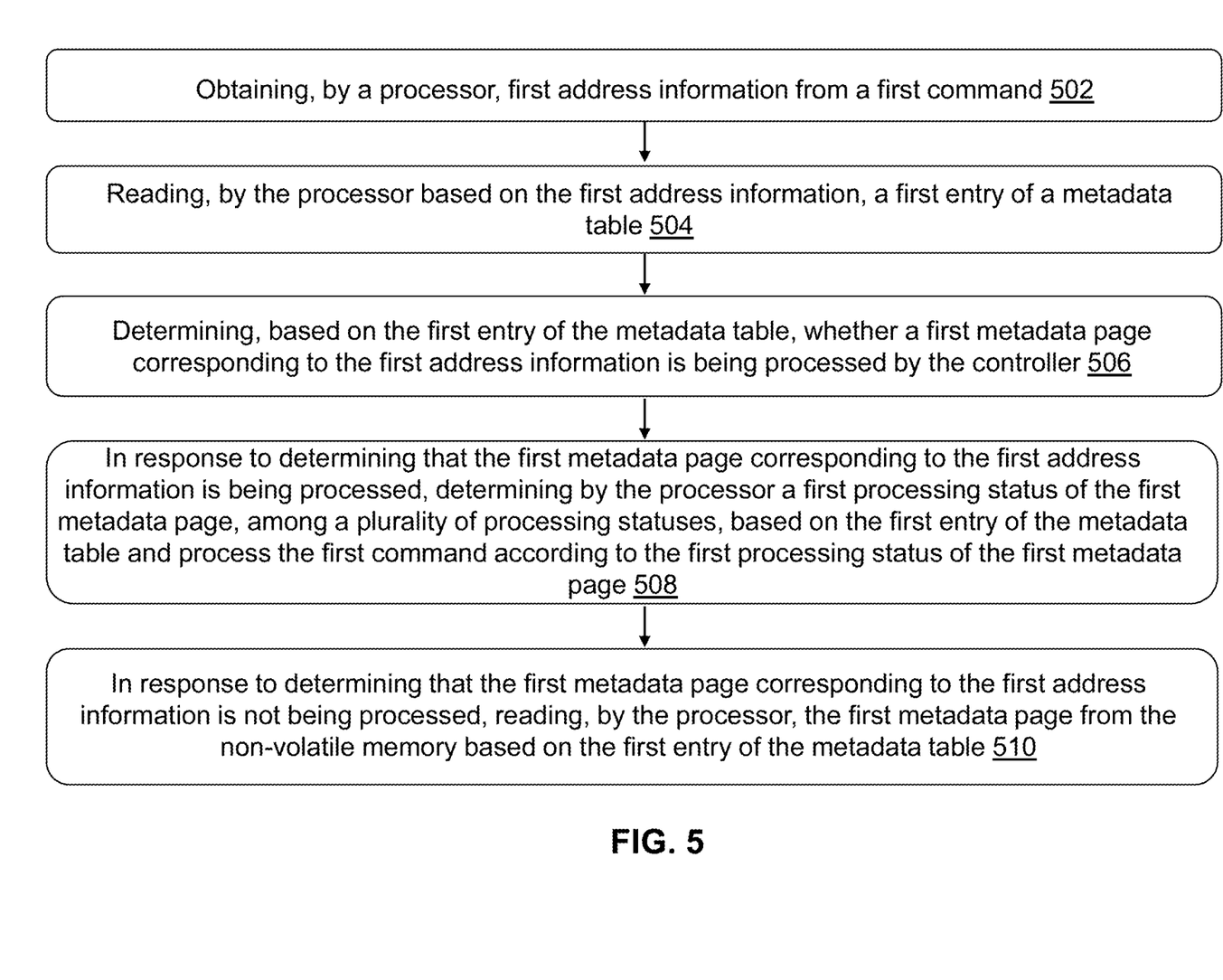
FIG. 5 is a flowchart illustrating an example methodology for performing command orchestration using address mapping, according to some embodiments.

FIG. 5 is a flowchart illustrating an example methodology for performing command orchestration using address mapping, according to some embodiments. In this example, the process begins in S502 by obtaining, by a processor (e.g., processor 250 in FIG. 1), first address information (e.g., logical address information 312, 372 in FIGS. 3A and 3B) from a first command (e.g., command 310, 370 in FIGS. 3A and 3B).

In S504, in some embodiments, the processor may read based on the first address information, a first entry of a metadata table (e.g., entry 332 of metadata map 330 in FIG. 3A). In some embodiments, the metadata table may be stored in volatile memory (e.g., DRAM 110 in FIG. 1).

In S506, in some embodiments, the processor may determine, based on the first entry of the metadata table (e.g., address 342 in flash address space 362 or address 344 in system execution tag address space 364 in FIG. 3A), whether a first metadata page corresponding to the first address information is being processed by a controller. In some embodiments, in determining whether the first metadata page is being processed by the controller (e.g., when the entry contains an address 344 in system execution tag address space 364 in FIG. 3B), the processor may determine a first address (e.g., address 342 or address 344 in FIGS. 3A and 3B) based on the first entry (e.g., entry 332 in FIGS. 3A and 3B), determine, in response to determining that the first address (e.g., address 342 in FIG. 3A) is within an address space of the non-volatile memory (e.g., flash address space 362 in FIGS. 3A and 3B), that the first metadata page (e.g., metadata page 1 (363) in FIG. 3A) is not being processed, and determine in response to determining that the first address (e.g., address 344 in FIG. 3B) is outside of an address space of the non-volatile memory (e.g., system execution tag address space which is outside of flash address space 362 in FIG. 3B), that the first metadata page is being processed.

In some embodiments, each of the plurality of processing statuses may be associated with a respective address space (e.g., pack tag address space 412, system execution tag address space 410, trim tag address space 408, write cache tag address space 406, read cache tag address space 404 in FIG. 4) that is outside of an address space of the non-volatile memory. In determining the first processing status of the first metadata, the processor may determine a first address (e.g., address 344 in FIG. 3B) based on the first entry (e.g., entry 332 in FIG. 3B) and determine that the first address (e.g., address 344 in FIG. 3B) is within the address space associated with the first processing status (e.g., the system execution tag address space 364 in FIG. 3B).

In S508, in some embodiments, in response to determining that the first metadata page corresponding to the first address information is being processed (e.g., when the entry contains an address 344 in system execution tag address space 364 in FIG. 3B), the processor may determine a first processing status (e.g., a status of being loaded as indicated by execution tag 365 in FIG. 3B) of the first metadata page, among a plurality of processing statuses, based on the first entry of the metadata table (e.g., entry 332 of metadata map 330 in FIG. 3B) and process the first command according to the first processing status of the first metadata page (e.g., add to a queue 366 a request from the command 2 in FIG. 3B). In some embodiments, the plurality of processing statuses (e.g., statuses indicated by a plurality of tags as shown in FIG. 4) may include at least one of status of loading for a read operation (e.g., ExecTag in FIG. 4), status of loading for a trim operation (e.g., TrimTag in FIG. 4), status of loading for a pack operation (e.g., PackTag in FIG. 4), status of page in a cache (e.g., RdCacheTag in FIG. 4), or status of dirty page in a cache (e.g., WrCacheTag in FIG. 4).

In some embodiments, the processor may create a first queue of requests (e.g., queue 366 in FIG. 3A) for the first metadata page (e.g., metadata page 1 (363) in FIG. 3A). In response to determining that the first metadata page is being processed, the processor may add to the first queue (e.g., queue 366 in FIG. 3B) a request (e.g., request 368 in FIG. 3B) corresponding to the first command (e.g., command 2 (370) in FIG. 3B). The processor may determine whether a current processing of the first metadata page is completed. In response to determining that the current processing of the first metadata page is completed, the processor may remove a request from the first queue (e.g., queue 366 in FIG. 3B) and process the removed request (e.g., request 368 in FIG. 3B) by reading the first metadata page (e.g., metadata page 1 (363) in FIG. 3B). The processor may determine whether a current processing of the first metadata page is completed. In response to determining that the current processing of the first metadata page is completed, the processor may determine that the first queue is empty. In response to determining that the first queue is empty, the processor may update the first entry of the metadata table (e.g., entry 332 of metadata map 330 in FIG. 3B) with an address of the non-volatile memory indicating a location of the first metadata page (e.g., address of the metadata page 1 (363) in FIG. 3B). In some embodiments, the first queue may be a linked list (e.g., linked list implementation of queue 366 in FIG. 3B).

In S510, in some embodiments, in response to determining that the first metadata page corresponding to the first address information is not being processed (e.g., when the entry 332 contains an address 342 in flash address space 362 in FIG. 3A), the processor may read the first metadata page 363 from the non-volatile memory based on the first entry of the metadata table (e.g., the address 342 contained in the entry 332 in FIG. 3A).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. The functions implemented in software may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A device for processing commands to manage non-volatile memory, comprising:
    a controller; and
    volatile memory,
    wherein the controller is configured to:
        obtain first address information from a first command;
        read, based on the first address information, a first entry of a metadata table, wherein the metadata table is configured to include a plurality of entries that each provide either mapping information that specifies a mapping between address information from a command and a page address in the non-volatile memory or additional information that specifies a processing status of metadata pages in the non-volatile memory;
        determine, based on the first entry of the metadata table, whether a first metadata page corresponding to the first address information is being processed by the controller;
        in response to determining that the first metadata page corresponding to the first address information is being processed, determine a first processing status of the first metadata page, among a plurality of processing statuses, using the additional information in the first entry of the metadata table; and
        in response to determining that the first metadata page corresponding to the first address information is not being processed, read the first metadata page from the non-volatile memory into the volatile memory using the mapping information in the first entry of the metadata table and replace the mapping information in the first entry of the metadata table with the additional information.

2. The device of claim 1, wherein the metadata table is stored in the volatile memory.

3. The device of claim 1, wherein the plurality of processing statuses include at least one of status of loading for a read operation, status of loading for a trim operation, status of loading for a pack operation, status of page in a cache, or status of dirty page in a cache.

4. The device of claim 1, wherein
    in determining whether the first metadata page is being processed by the controller, the controller is configured to:
        determine a first address based on the first entry;
        in response to determining that the first address is within an address space of the non-volatile memory, determine that the first metadata page is not being processed; and in response to determining that the first address is outside of an address space of the non-volatile memory, determine that the first metadata page is being processed.

5. The device of claim 1, wherein each of the plurality of processing statuses is associated with a respective address space that is outside of an address space of the non-volatile memory.

6. The device of claim 5, wherein in determining the first processing status of the first metadata page, the controller is configured to:
determine a first address based on the first entry; and
determine that the first address is within the respective address space associated with the first processing status.

7. The device of claim 1, wherein the controller is configured to:
create a first queue of requests for the first metadata page; and
in response to determining that the first metadata page is being processed, add to the first queue a request corresponding to the first command.

8. The device of claim 7, wherein the controller is configured to:
determine whether a current processing of the first metadata page is completed; and
in response to determining that the current processing of the first metadata page is completed, the controller is configured to remove a request from the first queue.

9. The device of claim 7, wherein the controller is configured to:
determine whether a current processing of the first metadata page is completed; and
in response to determining that the current processing of the first metadata page is completed,
determine that the first queue is empty, and
in response to determining that the first queue is empty, update the first entry of the metadata table with the metadata page address in the non-volatile memory for the first metadata page.

10. The device of claim 7, wherein the first queue is a linked list.

11. A method of processing commands to manage non-volatile memory, comprising:
obtaining, by a processor, first address information from a first command;
reading, by the processor based on the first address information, a first entry of a metadata table, wherein the metadata table is configured to include a plurality of entries that each provide either mapping information that specifies a mapping between address information from a command and a page address in the non-volatile memory or additional information that specifies a processing status of metadata pages in the non-volatile memory;
determining, by the processor based on the first entry of the metadata table, whether a first metadata page corresponding to the first address information is being processed by a controller;
in response to determining that the first metadata page corresponding to the first address information is being processed, determining by the processor a first processing status of the first metadata page, among a plurality of processing statuses, using the additional information in the first entry of the metadata table; and
in response to determining that the first metadata page corresponding to the first address information is not being processed, reading, by the processor, the first metadata page from the non-volatile memory into the volatile memory using the mapping information in the first entry of the metadata table and replacing the mapping information in the first entry of the metadata table with the additional information.

12. The method of claim 11, wherein the metadata table is stored in volatile memory.

13. The method of claim 11, wherein the plurality of processing statuses include at least one of status of loading for a read operation, status of loading for a trim operation, status of loading for a pack operation, status of page in a cache, or status of dirty page in a cache.

14. The method of claim 11, wherein determining whether the first metadata page is being processed by a controller comprises:
determining a first address based on the first entry;
in response to determining that the first address is within an address space of the non-volatile memory, determining that the first metadata page is not being processed; and
in response to determining that the first address is outside of an address space of the non-volatile memory, determining that the first metadata page is being processed.

15. The method of claim 11, wherein each of the plurality of processing statuses is associated with a respective address space that is outside of an address space of the non-volatile memory.

16. The method of claim 15, wherein determining the first processing status of the first metadata comprises:
determining a first address based on the first entry; and
determining that the first address is within the address space associated with the first processing status.

17. The method of claim 11, further comprising:
creating a first queue of requests for the first metadata page; and
in response to determining that the first metadata page is being processed, adding to the first queue a request corresponding to the first command.

18. The method of claim 17, further comprising:
determining whether a current processing of the first metadata page is completed; and
in response to determining that the current processing of the first metadata page is completed, removing a request from the first queue.

19. The method of claim 17, further comprising:
determining whether a current processing of the first metadata page is completed; and
in response to determining that the current processing of the first metadata page is completed,
determining that the first queue is empty, and
in response to determining that the first queue is empty, updating the first entry of the metadata table with the metadata page address in the non-volatile memory for the first metadata page.

20. The method of claim 17, wherein the first queue is a linked list.

* * * * *